SYSTEM FOR REPRODUCING SUPERSONIC IMAGES

Filed June 2, 1952 3 Sheets-Sheet 1

INVENTOR.
EDWARD EMANUEL SHELDON
BY Philip G. Hilbert
ATTORNEY

SYSTEM FOR REPRODUCING SUPERSONIC IMAGES

Filed June 2, 1952 3 Sheets-Sheet 2

INVENTOR.
EDWARD EMANUEL SHELDON
BY Philip S. Hilbert
ATTORNEY

SYSTEM FOR REPRODUCING SUPERSONIC IMAGES

Filed June 2, 1952 3 Sheets-Sheet 3

INVENTOR.
EDWARD EMANUEL SHELDON
BY
Philip G. Hilbert
ATTORNEY 2,886,634
Patented May 12, 1959

2,886,634

SYSTEM FOR REPRODUCING SUPERSONIC IMAGES

Edward Emanuel Sheldon, New York, N.Y.

Application June 2, 1952, Serial No. 291,349
4 Claims. (Cl. 178—6.8)

This invention relates to a method and device for examination of various objects and living bodies by means of acoustic radiation and in particular by means of supersonic waves.

There are many devices known in the art for the purpose of supersonic examination. All of them, however, relate to producing signals indicating the information desired but are not suitable for providing two-dimensional or three-dimensional images of said information.

One primary object of this invention is to provide means for producing two or three dimensional supersonic images of the examined body, as distinguished from one-dimensional signals produced by devices of the prior art.

Another object is to provide a method and device of producing supersonic images of greater detail than was possible until now.

Another important objective of this invention is to provide a method and device for amplifying the contrast of supersonic images.

The objectives of this invention were attained by the use of a novel supersonic image reproducing system. This supersonic intensifying system is characterized by the use of a novel supersonic sender for producing a scanning supersonic beam moving in television-like raster. The scanning supersonic beam impinges successively on the examined body irradiating in this way the whole examined area and forming thereby plurality of pin-point supersonic images of said examined area. The pin-point images are received by a novel supersonic sensitive receiver which transforms said successive supersonic images by the reverse piezo-electric effect into charges or potentials having the pattern of said image point. The charges or potentials corresponding to said image points are irradiated by an electron beam. The electron beam is modulated by said charge or potential image points. The modulated electron beam is converted next into electrical video signals. Video signals are sent to amplifiers. By the use of variable mu amplifiers in one or two stages, intensification of video signals can be produced in non-linear manner, so that small differences in intensity of succeeding video signals can be increased one to ten times, producing thereby a corresponding gain of the contrast of the final visible image in receivers, which was one of the objectives of this invention. Amplified video signals are transmitted to kinescopes to reproduce a visible image with necessary intensification. The kinescopes may be of a fluorescent type, phosphorescent type, or opacifying so called "dark trace" type. Also facsimile receivers or electrographic cameras may be used for this purpose.

In some cases, it may be necessary to include a special storage tube in the invisible radiation image intensifying system, in order to overcome the flicker resulting from too long a frame time. In such case, video signals are sent to the storage tube having a special storage target and are deposited there by means of modulating electron scanning beam of said storage tube. The stored electrical charges having the pattern of supersonic image, are released from said electrode, after predetermined time, by scanning it with another electron beam, or, in a modification of the storage target having photoemissive elements, by irradiating it with light. The released electron image is converted again into video signals and sent to final receivers to reproduce invisible image with desired intensification and gain in contrast and sharpness.

It is obvious that my invention is not limited to supersonic radiations, but it may also be used for other invisible radiations, such as infra-red or ultra-violet.

The invention will appear more clearly from the following detailed description when taken in connection with the accompanying drawings by way of example only preferred embodiments of the inventive idea.

In the drawings:

Figure 1 shows a diagrammatic cross-sectional view of the supersonic image intensifying system.

Figure 1*a* shows a modification of the storage tube.

Figure 2 shows a modification of the supersonic image intensifying system.

Figure 2*a* represents the novel supersonic sender.

Figures 3, 4, 4A, 6A:
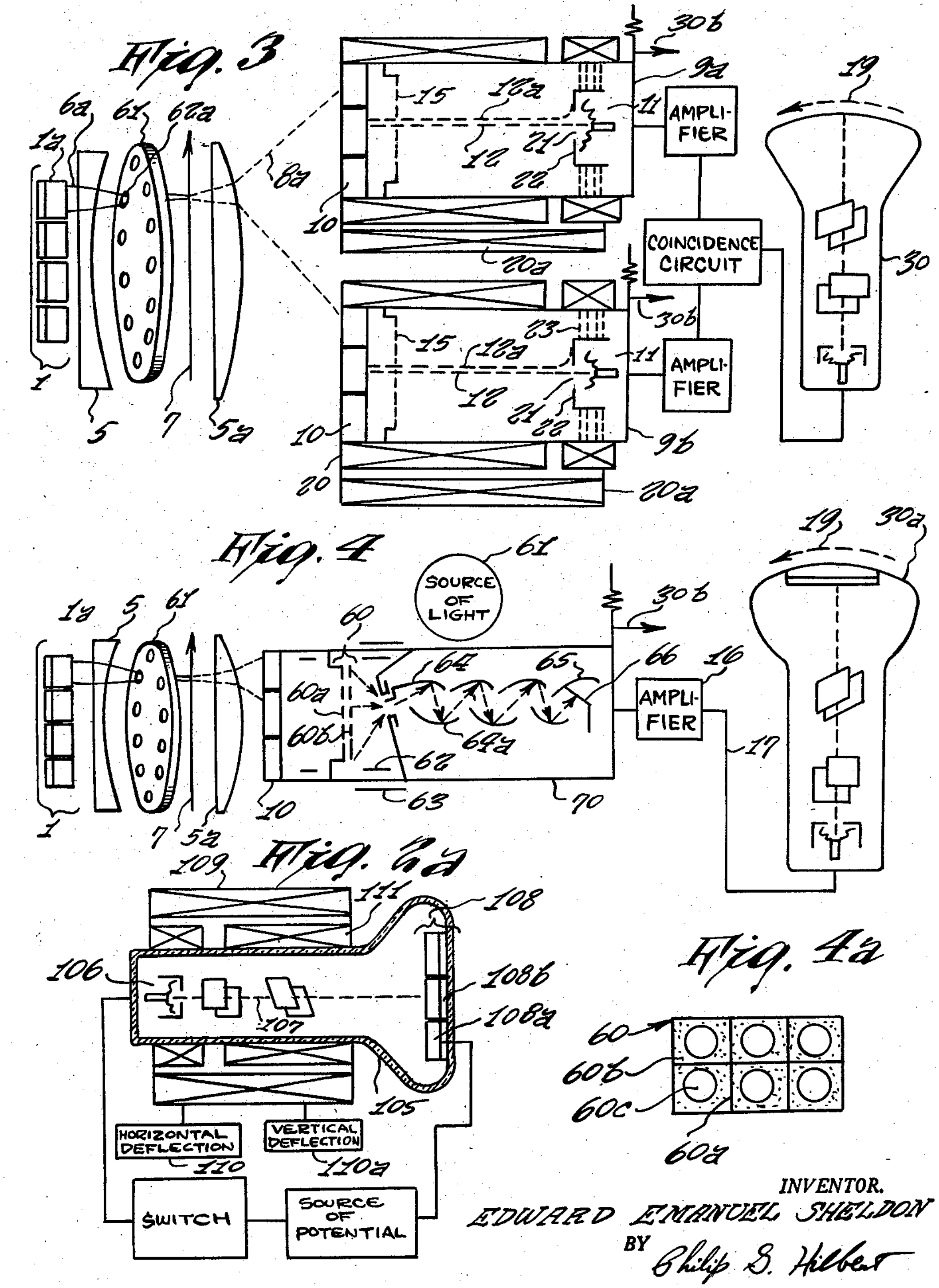
Figure 3 represents the supersonic image intensifying system having plurality of pick-up tubes.
Figure 4 represents a modification of the supersonic radiation image sensitive pick-up tube having photo-emissive elements.

Figure 4*a* shows a plan view of photoemissive target.

Figures 5, 6, 7, 8, 9:
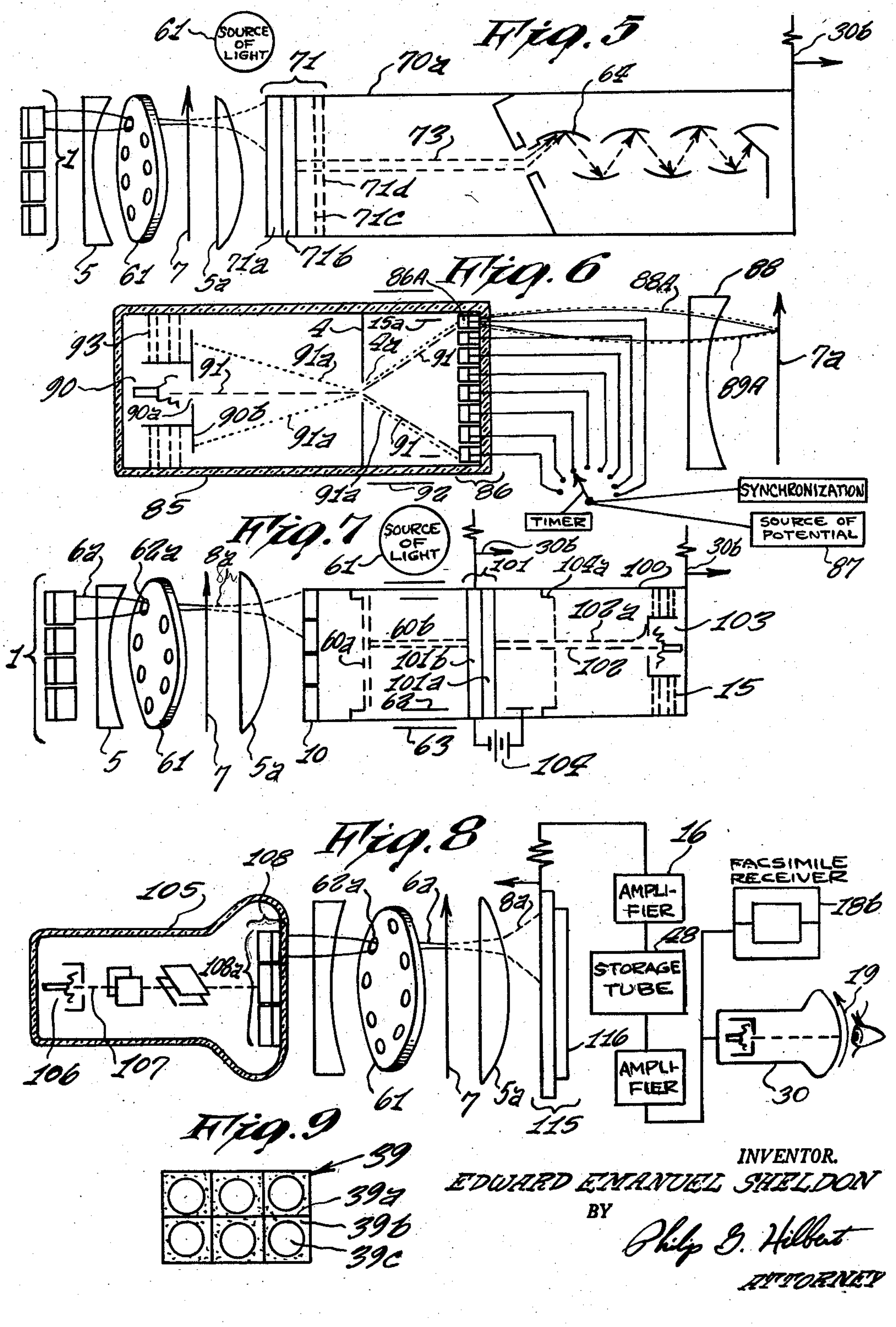

Figure 5 shows a modification of the supersonic image sensitive intensifying system using a pick-up tube with a perforated piezo-electric target.

Figure 6 shows a modification of the supersonic image pick-up tube.

Figure 7 represents a modification of supersonic system using electron induced conductivity.

Figure 8 shows a simplified modification of the supersonic radiation image intensifying system.

Figure 9 represents a plan view of the perforated storage target.

Figures 1, 1A, 2:
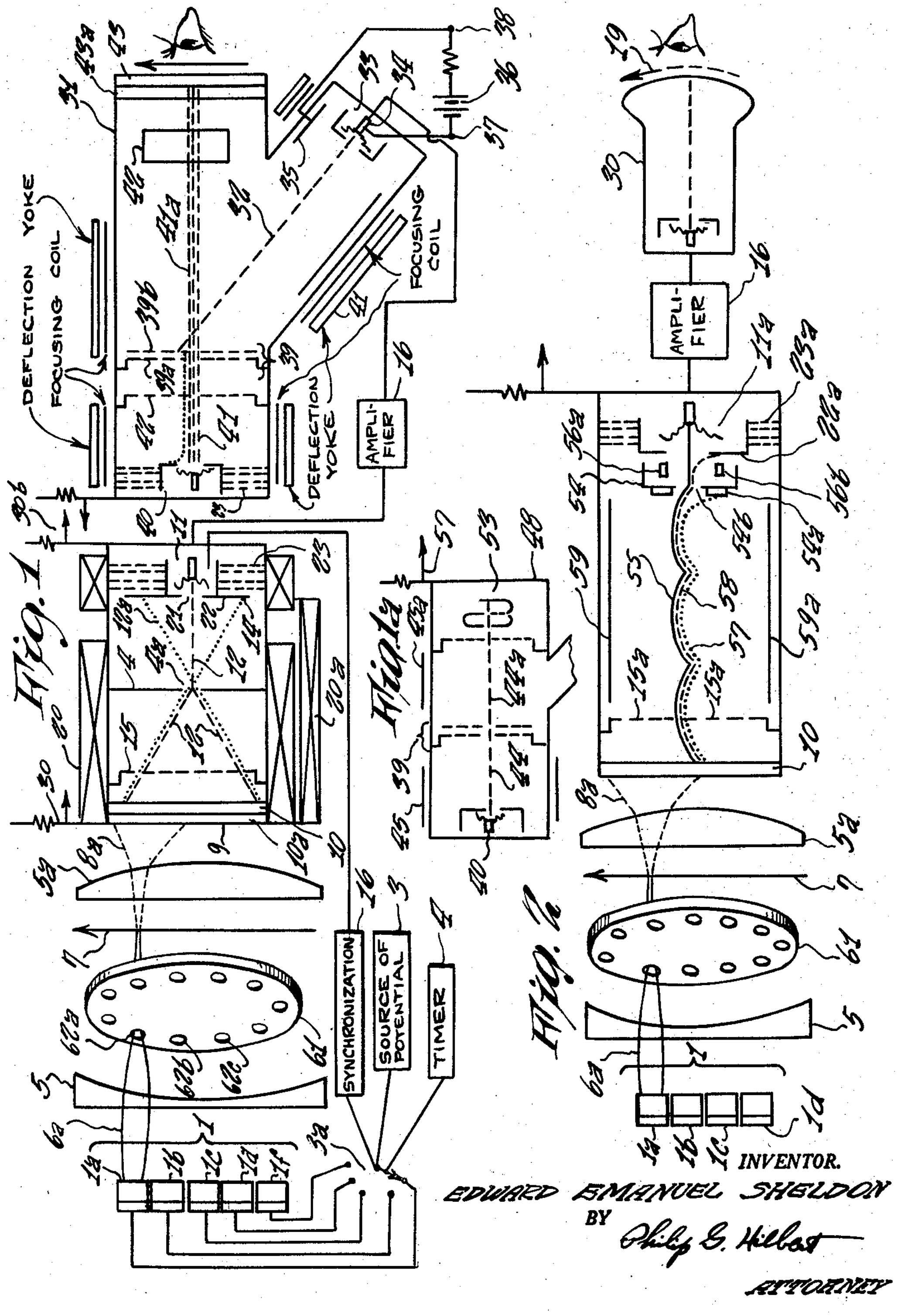

Reference will now the made to Fig. 1. The supersonic beam is produced by sender 1. The sender in this embodiment of invention consists of plurality of piezo-electric crystals 1*a*, 1*b*, 1*c*, 1*d*, etc., such as of Rochelle salt, tourmaline, $NH_4H_2PO_4$ known as ADP, $KH_2PO_4$ known as KDP, $KH_2AsO_4$, dipotassium tartrate, known as DKT, or ethylene diamine tartrate, known as EDT. It is to be understood that any piezo-electric material may be used for purposes of this invention. Piezo-electric crystals may be of various sizes and cuts. They should be selected to provide an equal and homogeneous output of supersonic energy, so that each crystal will produce the same quality and quantity of supersonic waves when excited by a high frequency source of potential. Quartz crystals usually can be selected to be more similar to each other than other piezo-electric materials. In case the crystals 1*a*, 1*b*, etc. do not have exactly the same output, they should be biased or damped to equalize their output. Furthermore, improvement of the homogeneity of the field may be obtained by using a mosaic of small crystals. Each crystal in the sender 1 has a metallic backing plate to provide a connection to the source of electrical potential 3. The crystals with their backing plates are insulated from each other, so that each one forms an independent unit. The crystals are energized sequentially by said source of potential by means of commutator 3*a* revolving at the predetermined speed regulated by timer 4. In the preferred form of this invention, crystals of the sender 1 are not excited in turn one after another, but in such a manner that the crystal 1*a* is energized first, then the crystal 1*f* is energized, then again, crystal 1*b*. Living tissues can stand much more supersonic energy, if there is time interval between two irradiations. If we excited two adjacent crystals, such as 1*a* and 1*b*, one after another, then, due to overlapping of two supersonic beams from two adjacent crystals, the tissues exposed to radiation from the second adjacent crystal, will not have time to recover from the effect of the first supersonic beam and may be easily injured. On the other hand, if we energize after crystal 1*a*, the crystal 1*f*, we irradiate different areas, which are separated from each other, and, therefore, the tissues have time to recover. The supersonic waves emitted from the energized crystal of the sender 1 spread transversely to form a broad lobe of acoustic energy. Such a lobe obviously cannot well be used for producing images with good definition and sharpness. Therefore, in my invention, I made use of acoustic lenses 5. The acoustic lenses may be of various forms and shapes, and it is to be understood that any device for focusing supersonic waves on the examined object may be used for the purposes of my invention.

One such modification, are Fresnel plates, which are known in the art and, therefore, it is believed that they do not have to be described in detail. The supersonic beam 6*a* from the crystal 1*a* is focused on the examined object 7. Instead of using lenses or mirrors, the sender crystals may be shaped to produce a parallel supersonic beam. In particular, a concave form of the crystal sender will be suitable for this purpose. Such parallel beam may be further focused by means of filters having a small aperture for transmission of a fine supersonic beam.

The diagnostic possibilities of supersonic waves reside in their characteristic properties of being reflected at the boundaries of two media having a different modulus of elasticity. Various tissues, fluids and air have different reflections, transmission and absorption coefficient values for supersonic waves. Therefore, the transmitted or reflected supersonic beam is modulated by the examined objects or tissues and carries information as to their pattern. For example, a cavity can be demonstrated inside of the body regardless of its thickness, a fluid or an air containing cavity may be shown, if present inside of the examined tissue. A very important indication for the use of supersonic waves is diagnosis of brain tumors, especially if they impinge on ventricles in the brain and deform them. Ventricles of the brain contain normally cerebro-spinal fluid, which has different absorption, reflection and transmission properties for supersonic waves than the adjacent brain tissues. At the present time, in order to visualize ventricles of the brain, it is necessary to inject into them air, in order to provide contrast for X-rays. The use of my invention will eliminate this difficult and sometimes dangerous procedure, as my device is able to visualize ventricles without injection of air.

Between the supersonic sender 1 and the examined body 7 there is disposed the rotating filter 61. This filter consists of a disc or a drum provided with multiple uniform apertures 62*a*, 62*b*, 62*c*, etc. The filter 61 is rotating at a high speed which depends on resolution of the image to be reproduced. The number of apertures 62 in the filter also controls the resolution of the image. The supersonic beam 6*a* from the crystal 1*a*, which is energized first, is transmitted in succession through small apertures 62*a*, 62*b*, 62*c*, etc. in the filter 61, and is reduced thereby each time to a fine beam having the diameter of said apertures. The rest of the supersonic beam 6*a* is stopped by the filter 61. It is very important that there should be no reflection of the stopped supersonic beam from the filter 61, because reflected supersonic waves will interfere with the operation of the sender 61. Therefore, the rotating filter 61 should be made of material having good absorption properties for supersonic waves. Rubber is suitable for this purpose. The supersonic beam 6*a* transmitted through the aperture 62*a* may be projected on the examined body 7. The use of rotating filter 61 allows having only one sender crystal for the examination. Such crystal has to be, however, large enough to irradiate the examined body. Large crystals are not suitable for producing high frequency supersonic waves. In medical examinations the frequency of supersonic waves should be in megacycles to provide a good definition of the image, as the wave length of supersonic images depends on their frequency. It is better, therefore, to use a small number of piezo-electric crystals assembled mechanically and to energize them sequentially by means of a commutator, as was explained above. The supersonic beam 8*a* transmitted through the examined body represents one invisible image point of said body. The beam 8*a* impinges now in the novel supersonic sensitive pick-up tube 9. The pick-up tube 9 has within it a target 10 of material responsive to supersonic waves, such as quartz, barium titanate, piezo-electric ceramics, lithium sulphate, ADT, DKT or EDT. The target-cathode 10 may be formed of one large crystal, or may be in the form of a mosaic made of a plurality of small crystals, forming a continuous surface and having a low lateral electrical resistivity. The impingement of supersonic beam 8*a* on the cathode 10 causes a so-called reciprocal piezo-electric effect. As a result, an electric charge or potential appears on the surface of the target 10 in the region which was struck by supersonic beam. Duration of this electrical charge or potential is very short. If the supersonic beam has frequency in megacycles, the electric charge will persist only a few micro-seconds. The supersonic beam 8*a* carrying the image information is allowed to spread over large area of the supersonic sensitive cathode 10. This can be obtained by the use of the divergent lens 5*a* or by positioning of the supersonic pick-up tube 9 at a proper distance from the examined body. As a result, the supersonic beam 8*a* strikes a large area of the cathode 10. The importance of this novel arrangement resides in the fact that the reverse piezo-electric effect is not uniform over the surface of the same crystal. It means that various areas of the same crystals produce different charges or potentials when impinged by the same supersonic beam. If such differences in output exceed certain percentage of the signal, the value of reproduced image will be markedly impaired. The cathode 10 therefore should be of piezo-electric material, such as lithium sulphate, which has a low resistivity in order to integrate charges from the whole surface of the cathode and to equalize thereby the piezo-electric effect over the surface of the cathode.

The electron gun 11 may also have a new construction. In particular, it may have a broad disc 14 attached to the aperture disc 22 to provide a large surface first dynode for the broad returning electron beam 12*a*. In some cases, the conventional electron gun may be used as well. The electron gun 11 produces electron beam 12. The electron beam 12 passes through the aperture 4*a* in the diaphragm 4; next it is spread by the action of magnetic or electro-static field 20 to cover a large part or all of the cathode 10. In some cases, the diaphragm 4 may be omitted and electron beam 12 is defocused at the defining aperture 21. The electron beam 12 is decelerated in front of the cathode 10 by the decelerating cathode 15, which may be in the form of a ring electrode or in the form of a mesh screen. The electron beam 12 approaches the cathode 10 with velocity close to zero volts. It is modulated by the charge or potential present on the cathode 10 due to the action of supersonic beam 8*a*. The modulated electron beam 12*a* returns to the electron gun and strikes the disc 14 and produces secondary electrons therefrom. The secondary electrons are drawn to the multiplier 23. They are intensified and multiplied therein by secondary electron emission. The electrons from the last stage of the multiplier are collected by the collector and are converted over a suitable resistor into video signals.

In some cases, the cathode 10 is provided with a conducting backing layer 10*a* on the side facing the supersonic image. In such case, video signals produced by the impingement of the scanning electron beam 12 on the cathode 10 may be taken off directly from said backing layer 10a.

In some cases, it is possible to use a focused supersonic beam instead of the defocused beam 8a. It is preferable then to divide the cathode 10 in a few areas, each area receiving supersonic beam from one crystal of the sender to represent one image point. In such event, the electron beam 12 is focused in the usual manner and is made to scan the cathode 10 in a regular television-like raster, which can be accomplished by the action of a suitable deflecting yoke, 20a.

So far only one point of the image of the examined body was obtained, which corresponded to the supersonic beam 8a from the sender 1a. Now the next image point is produced by the supersonic beam 6a transmitted through another aperture in the rotating filter 61. In this way, another fragment of the supersonic image is converted into video signals. This process continues until the whole image of the examined object has been produced in the form of video signals. In the preferred form of this invention, the activation of various senders does not occur in turn. After the sender 1a, the next sender to be activated is, instead of the sender 1b, the sender 1d. In this way, the damage to the examined body by supersonic waves is considerably reduced. My explanation of this phenomenon is that by providing the space between irradiated areas of living tissues, we obtain a better dissipation of heat energy generated by the absorption of supersonic waves. In this way, the sensitive tissues of materials can better recover in the interval between supersonic energy pulses. Video signals 30b having the pattern of the supersonic image after amplification are transmitted by high frequency waves or by a coaxial cable to receiver. Receivers may be of kinescope type 30. In some cases, a screen of long persistence phosphor is preferable to reproduce the total image of the examined body or a "dark trace" tube known also as a "skiatron." For examination of immovable objects, a facsimile receiver 30a can be used as well. The reproduced image may be enlarged in the receiver as much as it is necessary.

It is obvious that the sender, acoustic lenses, the examined body and the supersonic sensitive pick-up tube should be immersed in the liquid in order to reduce losses of supersonic energy. It is preferable to use a highly dielectric medium such as oil for this purpose. The compartment containing oil and supersonic image storage system is not shown in order not to complicate drawings.

In order to obtain amplification of contrast of the supersonic image, the amplifiers are provided with variable mu tubes in one or two stages. Small differences in intensity of the succeeding video signals are increased by variable mu tubes in non-linear manner, resulting in a gain of the contrast of the visible image in receivers.

It is obvious that the above described supersonic image reproducing system may be used not only for the transmitted supersonic beam, but for the reflected or scattered supersonic beam as well. This system may operate with longitudinal waves or with shear waves.

This system may also be well used for magnification of supersonic images and may serve therefore as a supersonic microscope.

It is evident that my invention can also serve as a supersonic spectroscope and for supersonic diffraction studies.

Instead of the supersonic sender 1 consisting of one or of a plurality of piezo-electro crystals, energized by commutator, I developed a novel sender which is more suitable for the purposes of this invention, as it will produce a fine scanning beam of supersonic waves moving across the examined object. The novel sender 105 is shown in Fig. 2a. It consists of a vacuum tube provided at one end with the electron gun 106. The electron gun produces fine electron beam 107 focused in the manner, well known in the art. The electron beam 107 is focused by suitable magnetic 111 or electrostatic fields and is deflected in two perpendicular to each other directions by the action of the deflection yoke 109. The action of the deflecting yoke makes the electron beam 107 to scan the target 108 disposed at another end of the tube 105 in the television-like raster. The deflecting coils of the deflection yoke 109 are operated by see-saw generators 110 and 110a for horizontal and vertical deflections of the scanning beam. The target 108 has a layer of piezo-electric material 108a which faces said electron beam 107 and another conducting layer 108b on the opposite side. The target 108 is deposited on the wall of the vacuum tube 105. The conducting layer 108b is connected to one terminal of the source of high frequency alternating potential 2. The other terminal of said source of alternating potential may be connected to the electron gun 106. The piezo-electric layer 108a is not subject to the action of the alternating potential 2 until the electron beam 107 impinges on the layer 108a and closes the circuit thereby. The impingement of the electron beam 107 activates, therefore, piezo-electric layer 108a and makes it vibrate and produce supersonic waves. The electron beam 107 is of the scanning type, as was described above. It produces, therefore, successive fine supersonic beams at all points at which it scans the target 108. This novel system makes it possible to produce a fine supersonic beam by all-electronic means without the use of cumbersome mechanical devices. Furthermore, the supersonic beam produced by this device can scan the examined object with a speed which could never be even approximated by mechanical devices of the prior art. The piezo-electric layer 108a may be made of one large piezo-electric crystal or may be made of a plurality of smaller crystals. The layer 108a should be preferably made of material having specific resistance large enough to prevent lateral spreading of the scanning electron beam. The layer 108a may be also in the form of a mosaic of minute crystals.

It is obvious that the novel supersonic sender will be especially suitable for supersonic microscopy or supersonic diffraction studies.

The beam 107 should preferably scan non-contiguous areas of target in succession.

It is evident that my device may also be used for producing the scanning infra-red beam. In such case, the layer 108a should be of material emitting infra-red rays when impinged by the scanning electron beam 107. Suitable materials for this purpose are carbides or ceramics. In such case, the conducting layer 108b may be eliminated and direct potential source be used instead of the alternating one.

Another embodiment of my invention is shown in Fig. 2. In this modification, the modulation of the electron beam 12a is markedly improved and its noise is decreased. The scanning electron beam 55 is given helical motion, which means an additional transverse velocity. This is accomplished by the use of two electrodes 56a and 56b disposed on both sides of the scanning beam 55. The electrodes 56a and 56b are provided with a positive potential from an extraneous source of electrical energy. The helical motion may also be produced in other ways, such as, for example by misalignment of the electron gun 11a in relation to the axial focusing field. The electron beam 55 is decelerated in front of the cathode 10 by means of ring electrode or preferably by using a mesh screen 15a. The electron beam 55 is modulated by the pattern of the electrical charges and potentials on the cathode 10. The returning electron beam consists of two different groups of electrons. One of them, 57, is made of electrons reflected by the photocathode 10, whereas the other group, 58 is formed by scattered electrons. The reflected electrons correspond to areas of the picture which received a weak supersonic exposure. The scattered electrons correspond to the strongly exposed areas of the picture, because said areas produce stronger charges on the target 10. The returning electron beam, consisting of these two different groups of electrons, is deflected from the original path of the beam 55, by electrodes 59 and 59*a*. These electrodes may be planar or curved and do not have to be described in detail, as they are well known in the art. In front of the electron gun 11*a*, there is disposed cylindrical electrode 54, which pulls the secondary electrons from the first multiplying dynode 22*a* into the multiplier 23*a*. A disc 54*a* is connected with the electrode 54 or forms a part of it. The disc 54*a* has an opening 54*b* which may be of a circular or rectangular shape. The electrodes 59 and 59*a* cause displacement of the returning electron beam downwards. As was explained above, the scattered electrons 58, having larger transverse velocity than the reflected electrons, are outside of the beam of the reflected electrons 57. Therefore, by depressing the returning electron beam by electrodes 59 and 59*a*, the reflected electrons may be directed against the disc 54*a* below its aperture 54*b* and will be eliminated, whereas the scattered electrons will be admitted into aperture 54*b*. In this way, both groups of electrons may be separated from each other. The scattered electrons, after passing through the aperture 54*b*, strike the first dynode 22*a* of the multiplier 23*a*. The secondary electrons are drawn by the action of the electrode 54 to the next stage of the multiplier, which is around and in the back of the first stage. This process is repeated in a few stages, resulting in a marked multiplication of the original electron signals. The signal currents from the last stage of the multiplier are converted over a suitable resistor into video signals. The strongest video signals will correspond to the highlights of the picture, because the strongest scattering of electrons takes place at the areas of the cathode 10, which are most charged. In front of the cathode 10 in some cases, there is disposed a mesh screen, which provides a uniform electrical field necessary for good resolution of the picture. Video signals are fed into the television amplifiers 16 and then are sent by coaxial cable or by high frequency waves to the receivers of kinescope type 30 or facsimile, in which they are reconverted into visible images 19 for inspection or recording.

As was explained above, one of the objectives of the present invention is to provide means of storing supersonic images so that the supersonic exposure of image may be kept within limits of safety for the patient or for living tissues in general. A few watts of acoustic energy per 1 square centimeter can be considered the maximum safe dose. It is obvious that it is of utmost importance to reduce the supersonic exposure as much as possible in order to be able to examine the patient without causing any injury. The best solution of this problem is the removal of supersonic irradiation as soon as the supersonic image has been formed. This can be done only if the supersonic image can be stored for the desired period of time without maintaining the supersonic irradiation. I accomplished this objective by providing a novel system in which the supersonic image can be stored in the special intermediate storage tube or in the receiver tube. In this embodiment of invention, video signals having the pattern of the examined object are sent from the pick-up device 9 to a special storage tube 31, in which they can be stored for the required time in the form of charge images. In this way, the supersonic image can be assembled from fragments and can be stored in the storage target 39 of the storage tube. When this image is to be read, the stored charge pattern may be reproduced as a visible image in the same storage tube or may be converted again into video signals. New video signals are now transmitted to regular kinescopes, in which they can be converted again into a visible image without any flicker and with any desired brightness. In this way, the need of a persistent phosphor in kinescope is eliminated. My invention will also allow the improvement of signal to noise ratio of the system. It is known that if we have an image in which signal to noise ratio is below 10 to 1, we can improve it by storing said image and by a gradual build-up of a stored image by superimposing a number of images one after another. It means, if we superimpose in the storage target one image having the pattern of the supersonic image after another, we will obtain a build-up image of much better signal to noise ratio than the original image.

In the embodiment of my invention illustrated in Fig. 1, video signals 30*b* having the pattern of supersonic image are transmitted after amplification by high frequency waves or by a coaxial cable to the novel storage tube 31. Video signals 30*b* are transmitted to the storage tube 31 and modulate cathode ray beam 32 produced by the electron gun 33. The cathode 34 of the electron gun 33 is provided with a negative potential. The second anode 35 may be in the form of a conducting coating on the inside surface of the tube envelope, and is supplied with a positive potential in relation to the potential of the cathode of the electron gun. The proper operating potentials may be applied to the electrode of the electron gun from potential source 36. Between its terminals 37 and 38, a potentiometer or a bleeder resistance may be connected in order that the relative potentials of the various electrodes may be properly selected. The horizontal and vertical scanning motion of the electron beam 32 across the storage target 39 is provided by the deflection yoke 41 having horizontal and vertical deflection coils. The deflection coils are energized by a cyclically varying current of a suitable wave form, which may be obtained from a horizontal deflection generator and from a vertical deflection generator. Deflection generators are well known in the art and are, therefore, not shown in the drawings. The cathode ray beam 32 transforms video signals 31*b* into a stored charge image in the storage target 39.

The storage target 39, shown also in Fig. 9, consists of a thin perforated sheet of metal or other conducting material, or of a woven conducting wire mesh 39*a*. On the side of the target facing the electron gun 40, there may be deposited by evaporation a thin coating to prevent leakage of charges. On the opposite side of the target 39, there is deposited a dielectric storage layer 39*b* in such a manner as not to obstruct the openings 39*c* therein. The scanning electron beam 32 is produced in the storage tube 31 by the electron gun 33, and is modulated by incoming video signals carrying the invisible supersonic charge. This scanning electron beam 32 should have the finest spot compatible with the required intensity of beam. In some cases, between the electron gun 33 and the storage target 39 in close spacing to the target, there is mounted a fine mesh conducting screen for collecting secondary electrons emitted from the dielectric layer 39*b* when scanned by electron beam 32. As a result of the impingement of the scanning beam 32 on the storage target 39, there are deposited on the storage target varying charges at successive points according to the amplitude of modulating input signals. The best way of operating my system is to have the storage surface at zero potential or at cathode potential and then to write on it "positive" which means to deposit positive charges. This can be accomplished by adjusting the potential of the surface of the storage target, so that its secondary emission is greater than unity. The secondary electrons from the layer 39*b* will be collected by the collecting anode or by an additional conducting mesh screen disposed in proximity of the storage target and positive charges will be left on the storage surface. These positive charges deposited on the storing surface of the target may be stored thereon for many hours depending on the type of the storage material 39*b* which was used. Whereas $BaF_2$ has a time constant of 0.1 second, $CaF_2$ has the time constant of 50 hours. Also, precipated silica, silicon dioxide and titanium dioxide may be used for this purpose. The storage target must prevent fading of the stored image, which would cause its disappearance. It must also be free from lateral leakage of stored charges, which would impair resolution of the image.

These conditions are satisfied by equation:

$$\frac{R_o AC = T}{B}$$

in which $R_o$ is equal to resistivity of the target in ohm-cm.

$A$=Picture area in square centimeters
$C$=Capacitance of the storage target
$T$=Storage time for one image in seconds
$B$=Thickness of storage target in centimeters In case the storage time of three seconds is desired, the electrical resistivity of $5\times10^{12}$ ohm-cm. will be suitable.

When the stored image is to be read, the electron gun 33 is inactivated and instead, electron gun 40 is activated. The electron gun 40 produces a broad electron beam 41. The electron beam 41 is slowed down in front of the storage target 39 by decelerating electrode 42, which may be in the form of ring electrode or a fine mesh screen. The passage of the broad electron beam 41 through the perforations in the target 39 is modulated by the pattern of deposited charges on said storage target. The greater the positive charge, the more electrons will pass through the openings 39*c* in the target. The less positive the stored charge, the fewer electrons will be transmitted through these openings. In this way, the electron beam 41 irradiating the storage target, will be modulated by the stored image. The transmitted electron beam 41*a*, therefore, will carry an image. This electron image is accelerated. The accelerating electrode 42 serves to accelerate transmitted electrons 41*a* to the fluorescent screen 43. The accelerating electrode may be in the form of a ring electrode or in the form of a conducting coating on the inside surface of the glass envelope. The accelerating electrode is provided with a positive potential from an external source of power, as described above.

Next, the electron image may be demagnified if its additional intensification is desired. The electron diminution of the image, in order to gain its intensification, is well known in the art and therefore does not have to be described in detail. The diminished electron image is projected on the fluorescent screen 43 at the end of the tube 31, where it can be viewed by the observer directly or by means of an optical magnifying eye-piece or may be photographed. The use of an optical eye-piece to magnify optically the electronically diminished image appearing on the fluorescent screen, is also well known in the art and therefore does not need further description. The fluorescent screen 43 is provided with an electron-transparent conducting backing 43*a*, such as of aluminum, which improves its efficiency.

On the other hand, if magnification of the supersonic image is needed, it can also be accomplished by electron-optical means.

The magnification of supersonic image may also be obtained in storage tube 31 and therefore, my device can also be used as a supersonic microscope.

After the stored image has been read and no further storage is desired, it may be erased by the use of the scanning electron beam 32 by adjusting the potential of the storage target to the value at which the secondary electron emission of its storing surface is below unity. In such case, the target will charge negatively to the potential of the electron gun cathode, and will neutralize the stored positive charges. The same results may also be obtained by changing velocity of the scanning electron beam 32.

It is obvious that the storage tube illustrated in Fig. 1 may be used as well for converting the stored supersonic image into new video signals instead of reproducing said image in the fluorescent screen 43. This embodiment 48 of my invention is shown in Fig. 1*a* in which, instead of the fluorescent screen 43, there is disposed a multiplier 53. The electron beam 44 is in this modification of a scanning type. The scanning deflection is provided by the deflection yoke 45. The electron beam scans the storage target in a television-like raster. The transmitted electrons 44*a* are fed successively into multiplier 53 by the action of the deflecting field 45*a*. The electrons 44*a*, after multiplication by secondary electron emission in the multiplier 53, are converted over a suitable resistor into video signals 57. Video signals 57 after amplification, are transmitted to receivers to reproduce the original supersonic image. The final reproduced supersonic image can be examined as long as the charge image is stored in the target 39 of the storage tube 48, without maintaining supersonic exposure.

It is obvious that my invention can also be used for supersonic microscopy and diffraction studies.

Better results may be obtained by using plural pick-up tubes 9 in my invisible radiation intensifying system, see Fig. 3. In this modification of my invention, the invisible supersonic sensitive image is projected onto two identical pick-up tubes 9*a* and 9*b*. The use of two phototubes allows a better utilization of the invisible radiation. Furthermore, it will help to improve signal to noise ratio by eliminating spurious signals. It is well known in the art that pick-up tubes have a large dark current, which means noise. Instead of cooling and refrigeration methods which are very cumbersome, I am using coincidence circuits in my invention. Coincidence circuits are designed to operate when they receive signals simultaneously from two sources. By the use of such circuits only, the signals coming from both phototubes simultaneously are transmitted into kinescope. The spurious signals usually arise only in one tube at a given time. Therefore, they will be cancelled out by the coincidence circuits, which as explained above, operate only if they receive signals from both phototubes simultaneously. Another way to eliminate spurious signals from the phototubes is to use discriminating circuits which will reject the pulses below a certain predetermined amplitude or time duration. As the spurious signals are of lower amplitude than the signals corresponding to X-ray images, they will, therefore, be eliminated by discriminating circuits. Coincidence circuits, as well as discriminating circuits, are well known in the art; therefore their detailed description is omitted in order not to complicate the drawings.

Another modification of my invention is shown in Fig. 4. In this embodiment of my invention, the supersonic sender 1 or 105 is the same as was described above.

The novel supersonic pick-up tube 70 has deposited on its wall inside of said tube target 10 made of piezo-electric materials sensitive to supersonic waves as described above. The target 10 has property of becoming conductive and producing a current of electrical charges and pattern of potentials thereon in response to said supersonic radiation. The target 10 in this embodiment of invention should be preferably in the form of one piezo-electric crystal or of plurality of said crystals which are contiguous to each other.

In close spacing, such as a few microns, from the cathode 10, there is mounted a composite, perforated screen 60 consisting of a fine mesh screen 60*a* of conducting material. On said mesh, there is deposited a photoemissive layer 60*b*, such as of CsOAg, cesium, potassium or lithium or antimony or bismuth, in such a manner as not to obstruct the openings 60*c* in the mesh screen 60*a*. A plan view of this screen is shown in Fig. 4*a*. The pattern of the electrical charges on the target 10 can be considered as a pattern of various potentials or electrical fields. I discovered that these potentials will modulate the emission of photoelectrons from the photoemissive layer 60*b*, although they are behind said layer. The layer 60*b* is irradiated by a source of light 61 and produces a strong beam of photoelectrons. The emission of photoelectrons from layer 60*b* depends on electrical fields in its proximity. The more negative the charges on the cathode 10, the more suppressed will be the emission of photoelectrons from layer 60b. In this way the photoelectron beam is modulated by the charges in the target 10, which have the pattern of the original supersonic image. The mesh screen 60a and the photoemissive layer 60b may also be deposited on the cathode 10 instead of being separated from said cathode.

The photoelectron beam emitted from the layer 60b is focused by fields 63 and can be further intensified by acceleration by electrostatic or by electromagnetic fields 62, as well as by electron-optical demagnification. Acceleration of electrons and electron-optical demagnification of electron image are well known in the art and therefore, it is believed, they do not have to be described in detail.

The photoelectron beam having the pattern of the invisible radiation image is accelerated by electric fields and is focused by means of magnetic or electrostatic fields on the secondary electron emitting electrode 64 which may be of solid or of mesh or of grid type. The secondary electrons released from the electrode 64 strike the next stage electron emitting electrode 64a, which is at a higher potential than the previous one. Since the multiplication of electrons by each electrode is cumulative, an amplification after nine stages may be as large as 2½ million times. The light shield in the form of a grid may be connected to the photocathode 60 to maintain the necessary electrostatic field distribution. The last electrode 65 is shaped to shield the collector anode 66. This prevents the anode voltages from interfering with the electrostatic fields necessary for operation of electrodes. A mica shield between the anode and photocathode may be used to prevent positive ion feedback. The secondary electron emissive electrodes may be of $Cs_3Sb$, $AgCs_2O$, AgCs, Ag:Mg. The supersonic receiver 70 may use electrostatic or electromagnetic fields. The arrangement and shape of secondary electron emitting electrodes in the supersonic receiver 70 may be of various types known in the art, such as used in partition type electron multiplier, circular electrostatic multiplier, box type electrostatic multiplier, etc. With a large electron emitting electrode 64, the best multiplier system is so-called pin-wheel multiplier. The potentials necessary for operation of the photocathode, the secondary electrodes and of the anode are supplied by an external source of electrical energy and are not shown. The signal currents from the last stage of the multiplier are converted over a suitable resistor into video signals and are fed into television amplifiers 16. After amplification, they are sent by coaxial cable or by high frequency waves to the receivers of kinescope type 30, skiatron type 30a of facsimile type in which they are reconverted into visible image 19 for inspection or for recording.

The synchronizing and deflecting circuits are not shown in detail as they are well known in the art and would only complicate the drawings.

Another modification of my invention is shown in Fig. 5. The supersonic image sensitive pick-up tube 70a has perforated composite target 71. The composite cathode 71 in this embodiment of my invention is deposited within the tube 70a on its wall. The composite photocathode 71 consists of a light transparent conducting layer 71a, on which is deposited the photoemissive layer 71b, which may be of continuous or of mosaic type. On the layer 71b, there is deposited a mesh screen 71c which supports piezo-electric crystals 71d deposited on it in such a manner as not to obstruct the openings in said mesh screen.

The screen 71a is irradiated by the source of light 61 simultaneously with the supersonic exposure. The light causes emission of photoelectron beam 73 from the photoemissive layer 71b. The emission of photo-electrons is controlled by the pattern of potentials present on the supersonic layer 71d, which corresponds to the original supersonic image. Furthermore, the passage of photo-electrons from the layer 71b through the perforated mesh screen 71c depends on potentials present around the openings therein. Therefore, the transmitted electron beam 73 in this arrangement is twice modulated by the pattern of said potentials and will also have the pattern of the original invisible supersonic image. The transmitted electron beam is now accelerated, is electron-optically diminished and is focused on the secondary electron emitting target 64 described above and illustrated in Fig. 4. The rest of the operation of this pick-up tube 70a is the same as of the tube 70 described above and illustrated in Fig. 4. The accelerating fields may be electrostatic or electro-magnetic. The focusing fields may also be of electrostatic or electro-magnetic type and are well known in the art. The electron point image is, after intensification, converted into video signals. Video signals are, after amplification, transmitted to receivers for reproducing of the visible images.

It is obvious that the sender, acoustic lenses, the examined body and the supersonic sensitive pick-up tube should be immersed in the liquid in order to reduce losses of supersonic energy. It is preferable to use a highly dielectric medium, such as oil for this purpose. The compartment containing oil and supersonic image storage system is not shown in order not to complicate drawings.

The above described supersonic image reproducing system may be used not only for the transmitted supersonic beam, but for the reflected or scattered supersonic beam as well. It may be used for longitudinal waves or for shear waves.

It is evident that my invention may also be used for supersonic microscopy. The invisible supersonic image of the examined body is converted into an electrical potential image or into an electron image. The latter images are converted again into electrical signals, as was explained above. The electrical signals can be used to reproduce the invisible image with any desired degree of magnification by the use of suitable electron-optical fields or deflection circuits. My device may also be used for supersonic spectroscopy and diffraction studies.

It should also be understood that any of the pick-up tubes illustrated in Figs. 1 to 8 may also be used for receiving infra-red images, provided that the cathode 10 or its modifications in said tubes is of a material sensitive to infra-red radiation, such as barium titanate, titanium dioxide, ceramics or others. In this event, polarizing potential should be preferably provided across infra-red sensitive layer. In such case, my invention may also serve as a system for reproducing infra-red images of various infra-red wave lengths, or it may also serve as an infra-red microscope or as a spectroscope.

Another modification of my invention is shown in Fig. 6. In this embodiment of invention, the function of supersonic sender and pick-up tube are performed by one and the same tube. The novel sender-pick-up tube 85 has target 86, which is made of a plurality of piezo-electric crystals, 86A, 86B, 86C, 86D, etc., such as quartz, barium titanate, ADP, DKT, EDT, lithium sulphate or other piezo-electric materials. Each crystal is provided with a conducting layer 86b, such as of metal. The target 86 is deposited inside of the tube 85 on its wall. Each of said crystals is connected separately to the source of potential 87. They are energized sequentially by the action of mechanical or preferably electronic commutator, as was explained above. The supersonic beam 88A produced by crystal 86A is focused by the acoustic lens 88 on the examined body. As was explained above, supersonic waves are reflected at the boundary of two different materials. Therefore, reflected supersonic waves are modulated by the examined body and carry its invisible image. The reflected supersonic beam 89A returns to the sender crystal 86A. The crystal 86A is now disconnected from the source of potential 87 by the action of commutator. The returning supersonic beam 89A impinging on its sender crystal 86A and adjacent ones produces therein a pattern of potentials or charges due to reverse piezo-electric effect. This pattern of charges or potentials is of very short duration, such as a few micro-seconds. The electron gun 90 is activated now and produces the electron beam 91. The electron beam 91 is slowed down in front of the target 86 by decelerating electrode, which may be in the form of a ring electrode or of a mesh screen 15*a*. The electron beam 91 must arrive to the crystal 86A and adjacent ones at the time when the pattern of charges is present thereon. Synchronization circuit serves to harmonize the action of the scanning electron beam 91 with the return of supersonic beam 89A. This method of operation has the following advantage. The spurious reflections of supersonic waves may be eliminated by my device. It means that if we know that the investigated area is a certain distance from the sender, we may calculate the time necessary for supersonic waves to return from this area and will energize the electron beam 91 according to this time. In such case, all supersonic waves reflected from objects at different planes than the investigated one will be ignored by the pick-up tube 85 and will not interfere with the image.

So far only one image point of the examined body which corresponds to the supersonic beam 88A has been reproduced. Now the next image point is reproduced, which corresponds to the supersonic beam 88B. In this way, all point images of the examined body are explored in succession by the scanning supersonic beam from the sender-cathode 86. The electron beam 91 passes through the aperture 4*a* in the diaphragm 4; next it is spread by the action of magnetic or electro-static field 92 to cover a large part or all of the cathode 86. In some cases, the diaphragm 4 may be omitted and electron beam 91 is defocused at the defining aperture 90*a*.

The electron beam 91 approaches the target 86 with a velocity close to zero volt. The electron beam 91 is modulated by the charge image having the pattern of supersonic image on the surface of the target 86. As a result, the returning beam 91*a* is modulated by said charge pattern on the target 86. The electron beam 91*a* returns now to the electron gun 90. The returning beam strikes the gun in the region around its defining aperture 90*a* and produces multiple secondary electrons. The aperture disc 90*b* of the gun serves, therefore, as the first stage of multiplier 93. The secondary electrons are directed now into multi-stage multiplier 93. The multiplier 93 intensifies further said electrons by secondary electron emission. The output current from the final stage of the multiplier 93 is converted by a suitable resistor into video signals. Video signals are fed into preamplifier and then into the amplifier in the usual manner. The amplified video signals from the sender-pick-up tube 85 having the pattern of the examined object, are now transmitted to any of the receiver tubes, as was explained above.

It is obvious that the supersonic sender-pick-up tube 85, the examined body and the lenses should be immersed in a compartment containing liquid, preferably such as of dielectric oil in order to avoid losses of supersonic energy. The tube 85 obviously must be rugged and free from microphonics. This modification of my invention may also be used for microscopy, spectroscopy and diffraction studies.

Another modification of my invention is shown in Fig. 7. In this embodiment of the invention, the pick-up tube 100 has supersonic radiation sensitive cathode 10, which was described above. The supersonic image produces a pattern of electrical potentials in the piezo-electric layer 10. This pattern of potentials modulates the emission of photo-electrons from the photo-emissive layer 60*b*, as it was shown in Fig. 4.

The photo-electron beam emitted from the layer 60*b* is focused by fields 63 and can be further intensified by acceleration by electro-static or by electro-magnetic fields 62, as well as by electron-optical demagnification. Acceleration of electrons and electron-optical demagnification of electron image are well known in the art and therefore, it is believed, they do not have to be described in detail. The photoelectron beam having the pattern of the invisible supersonic image is focused by means of magnetic or electro-static fields on the secondary electron emitting electrode 101. The target 101 is made of a dielectric layer 101*a* which has the property of becoming conductive when impinged by a fast electron beam and of a conducting layer 101*b*, which in this embodiment of the invention, is deposited on the side of the layer 101*a*, which faces the photo-electron beam. The materials suitable for the layer 101*a* are e.g. diamond, quartz, ZnS, MgO and other substances. The layer 101*a* must be very thin, such as of the order of a fraction of a micron. The conducting layer 101*b* may be of gold, platinum or silver and is also exceedingly thin, such as a fraction of a micron. The target 101 may be attached to the wall of the pick-up tube by means of metallic rings or may be deposited on the supporting mesh screen. The photo-electron beam from the layer 60*b* may be accelerated to necessary velocity to produce conductivity changes in the layer 101*a*. The impingement of the photo-electron beam makes, therefore, the target 101 conductive. A slow electron beam 102 produced by the electron gun 103 irradiates the target 101. The electron beam 102 is decelerated in front of the target 101 by a decelerating electrode 104*a*, which may be in the form of a mesh screen or of a ring electrode. As a result, the charges produced on the uncovered side of the layer 101*a* by the slow electron beam 102 can now pass through said layer 101*a* to the conducting layer 101*b* and be converted over a suitable resistor into video signals 30*b*. The returning electron beam 102*a* is also modulated. The returning electron beam can be directed to multipliers and after multiplication can be also converted into video signals. It is obvious that instead of a slow electron beam also a fast electron beam can be used for irradiating the target 101 and for producing video signals. In such case, the conducting layer 101*b* may also be on the side of the layer 101*a*, which faces the electron gun 103.

Another way of operating my device is to project the photo-electron beam from the photo-emissive layer 60*b* at velocity, at which it does not produce electron bombardment induced conductivity, but produces a secondary electron emission. The secondary electrons are led away by the adjacent mesh screen or by the collecting electrode. As a result, a charge image is stored on the dielectric layer 101*a*. The charge image may be positive or negative, which depends on the velocity of the photo-electron beam and on the material of the target 101*a*. Diamond, quartz, ZnS or MgO are suitable materials for the layer 101*a* in this modification of my invention as well. The conducting layer 101*b* should be in this modification on the side of the layer 101*a* which faces the electron gun 103. The target 101 is irradiated by a fast electron beam from the electron gun 103. The impingement of the fast electron beam which easily penetrates with the conducting layer 101*b* makes the dielectric layer 101*a* to be conductive. As a result, the charge image stored on the uncovered side of the layer 101*a* can pass through said layer to the conducting layer 101*b* and can be converted over a suitable resistor into video signals.

The signals due to induced conductivity produced by electron irradiation may be a hundred times or more stronger than the original signals, resulting in a marked amplification of the original signals, which was one of the objectives of my invention.

It is obvious that the target 101 may be used as well in other modifications of my invention. It is especially suitable for the embodiment illustrated in Fig. 5. In such case, the photo-electrons from the layer 71*b* transmitted through the perforated layer 71*d* are projected on the target 101. According to their velocity, they produce either a stored charge image or induced conductivity in the dielectric layer 101*a*. In this modification of my invention, another electron gun must be disposed on the opposite side of said target 101 to produce an electron beam for irradiating said target 101 and to produce thereby a flow of charges across said target, which, as was explained above, may be converted into video signals. The electron beam from this electron gun for irradiating the target 101 may be of the fast type or of a slow type as well.

The operating of the target 101 may be markedly improved by providing a polarizing potential 104 across the layer 101*a* in order to prevent recombination of the positive and negative charges produced within said layer by electron bombardment. The potential necessary for this purpose may be provided by an extraneous source of potential, such as a battery. Better results may be obtained by using a low frequency alternating source of potential.

A simplified form of my invention is shown in Fig. 8. The supersonic image produced by the sender 105 is projected in this embodiment of the invention on supersonic waves sensitive receiver 115. The receiver 115 consists of a thin plate 116 of supersonic sensitive material, such as quartz, barium titanate, ADP, EDP, lithium sulphate or other piezo-electric materials. The piezo-electric plate 116 has a metallic backing 116*a*. The supersonic sensitive layer may be made of one large crystal or of a plurality of small crystals, which may be put together mechanically or which may be properly oriented by supersonic waves. It may also have a micro-crystalline structure. The supersonic beam from the layer 108*a* is focused on the rotating filter 61, as was explained above. The supersonic beam 6*a* transmitted through the aperture 62*a* impinges on the examined body 7 and produces an image point thereof. This supersonic image point is now projected on the receiver 115. The supersonic point images produce successively in the layer 116 of said receiver 115 electrical charges or potentials due to reverse piezo-electric effect. The signals can be successively taken off the metallic layer 116*a* and may be fed into pre-amplifier and then into amplifier. The amplified signals are transmitted to one of the receiver tubes described above. This system should preferably operate with a defocused supersonic beam representing one image point of the examined body in order to eliminate non-uniformity of the response of piezo-electric crystals.

The signals representing various image points may also be stored as charges and assembled in the storage target of the storage tube 31 or 48, according to the pattern of supersonic image. The rest of the operation of this storage system will be the same as was described above in Fig. 1.

This supersonic system has the advantages of simplicity. It is not as sensitive as other systems described above, because it has a much higher noise. In particular, the noise in this system will be the noise of the amplifier, which is about 2 micro-volts. On the other hand, the noise of the systems illustrated in Figs. 1, 2, 3 or 4 is lower by a factor of 100, being a noise of the scanning electron beam.

It is obvious that the sender, acoustic lenses, the examined body and the supersonic sensitive pick-up device must be immersed in the liquid in order to reduce losses of supersonic energy. It is preferable to use a highly dielectric medium, such as oil for this purpose. The compartment containing oil and supersonic image storage system is not shown in order not to complicate drawings. This system may be used for longitudinal waves or with shear waves.

It is obvious that the above described supersonic image reproducing systems may be used not only for the transmitted supersonic beam, but for the reflected or scattered supersonic beam as well. They may also be used for supersonic microscopy, spectroscopy or diffraction studies.

As various possible embodiments might be made of the above invention, and as various changes might be made in the embodiment above set forth, it is to be understod that all matter herein set forth or shown in the accompanying drawings is to be interpreted as illustrative and not in a limiting sense.

I claim:

1. A sonic image reproducing system comprising in combination means for producing a scanning sonic radiation beam for forming successive image points of an examined body, a pick-up tube having within said tube vibratile means for receiving said sonic radiation image points of said body and for converting said received sonic image points successively into video signals said vibratile means being disposed within said tube in such a manner that the front surface and back surface of said vibratile means is inside of said tube, and means for receiving said video signals.

2. A vacuum tube comprising in combination in said tube a target sensitive to sonic radiation, a source for producing an electron beam, means for decelerating said electron beam and means for irradiating with said electron beam said target.

3. A vacuum tube comprising within said tube a sonic radiation sensitive target deposited on the wall of said tube, a source of an electron beam, means for decelerating said electron beam and means for irradiating with said electron beam said target.

4. A device as defined in claim 1, in which said vibratile means comprise piezo-electric material.

References Cited in the file of this patent

UNITED STATES PATENTS

| | | |
|---|---|---|
| 2,403,066 | Evans | July 2, 1946 |
| 2,453,502 | Dimmick | Nov. 9, 1948 |
| 2,528,725 | Rines | Nov. 7, 1950 |
| 2,700,895 | Carson | Feb. 1, 1955 |